United States Patent

Ankrapp et al.

[11] 4,401,340
[45] Aug. 30, 1983

[54] WINDOW REVEAL MOLDING

[75] Inventors: John H. Ankrapp, Bloomfield Hills; Donald J. Holzen, Mt. Clemens; Donald F. Rinke, Warren, all of Mich.

[73] Assignee: General Motors Corporation, Detroit, Mich.

[21] Appl. No.: 326,856

[22] Filed: Dec. 3, 1981

[51] Int. Cl.³ .............................................. B60J 1/02
[52] U.S. Cl. ........................................ 296/93; 52/208
[58] Field of Search .................. 296/93, 201; 52/716, 52/717, 718, 206

[56] References Cited

U.S. PATENT DOCUMENTS

| | | | |
|---|---|---|---|
| 2,763,346 | 9/1956 | Clingman | 296/93 |
| 2,945,268 | 7/1960 | Takenaka et al. | 296/93 |
| 3,155,422 | 11/1964 | Campbell et al. | 296/93 |
| 3,705,470 | 12/1972 | Kent | 52/208 |
| 4,135,277 | 1/1979 | Taniai | 296/93 |
| 4,139,971 | 2/1979 | Kimura | 52/208 |
| 4,165,119 | 8/1979 | Hedeen et al. | 296/93 |
| 4,278,286 | 7/1981 | Kiba | 296/93 |
| 4,332,412 | 6/1982 | Nakazawa | 296/93 |

OTHER PUBLICATIONS

Nissan Motor KK GB 2076-044 published 1/13/82 in World Patent Journal.

Primary Examiner—Robert R. Song
Attorney, Agent, or Firm—Patrick M. Griffin

[57] ABSTRACT

A vehicle body reveal molding includes an elongated, extruded body portion inserted in a bead of adhesive between the edge of a windshield and a flange of a roof panel. The body portion includes a first leg overlying the edge of the windshield and a second leg along the flange. The first leg terminates in a sloped lip extending from the windshield toward the roof panel and the second leg terminates in a lip overlying the roof panel. A decorative strip is secured to the body portion intermediate the lips. The sloped lip, the outer wall of the decorative strip and the lip of the second leg form a streamlined transition from the windshield to the roof panel.

2 Claims, 2 Drawing Figures

WINDOW REVEAL MOLDING

BACKGROUND OF THE INVENTION

This invention relates to reveal moldings for motor vehicle bodies and more particularly to a decorative molding for concealing the space between a window and an adjacent outwardly offset vehicle body panel and forming a streamlined transition therebetween.

It is known to conceal the space between a window and a vehicle body panel with a metal reveal molding attached to the vehicle by clips or studs spaced along the molding and attached to the body panel. It is also known to provide a plastic extruded reveal molding which is inserted into a bead of curable adhesive in the space to attach the molding to the body panel, as is shown in the patent to Hedeen et al U.S. Pat. No. 4,165,119. It is also known to provide extruded reveal moldings in which decorative metal strips are inserted, such as shown in the patent to Clingman, U.S. Pat. No. 2,763,346.

SUMMARY OF THE INVENTION

The subject invention provides a reveal molding for a motor vehicle which conceals the space between the peripheral edge of a window and the peripheral flange of an adjacent offset body panel and forms a streamlined transition between the window and the body panel. The molding includes an elongated body portion secured in the space between the window edge and the body panel flange. The body portion has a first side respective to the window edge and a second side respective to the body panel flange. The first side includes an integral leg which extends laterally therefrom over the peripheral edge of the window and terminates in a retroflex lip which extends angularly away from the window toward the body panel. The second side also includes an integral leg extending laterally therefrom along the body panel flange and terminating in a retroflex lip overlying the body panel.

The elongated body portion further includes an integral elongated rib intermediate the integral legs which terminates in a rounded shoulder. The elongated rib is offset from the center of the body portion toward the first side thereof. A pair of arcuate integral resilient fins extend from the rib intermediate the shoulder and the body portion. An elongated decorative strip with a generally C-shaped cross-section includes a pair of return bent side walls and a decorative outer wall. The side walls have a lateral separation which is slightly less than the lateral separation of the retroflex lips of the first and second legs. The decorative strip is assembled to the body portion by slide fitting the strip over the elongated rib and resilient fins. Each fin engages the inside of one of the side walls and the shoulder of the elongated rib engages the inside of the outer wall.

The molding, including the assembled body portion and elongated strip, is mounted to the body by inserting the body portion in the space between the edge of the window and the body panel flange. The body portion is secured in this space by being partially inserted into the bead of curable adhesive which attaches the window to a terminal flange of the body panel which extends laterally to the peripheral flange and underlies the edge of the window. The return bent side walls of the strip engage respective legs of the body portion to seat these legs against the window and body panel flange and seat the retroflex lips against the window and the body panel. This provides a streamlined transition between the window and the body panel which includes the retroflex lip on the first leg extending angularly from the window in the direction of the body panel, the outer wall of the elongated strip, and the second retroflex lip.

It is, therefore, an object of the invention to provide a decorative reveal molding for a motor vehicle which conceals the space between the peripheral edge of a window and a peripheral body panel flange and which streamlines the transition from the window to the body panel which is outwardly offset of the window. It is a further object to provide such a molding in which the streamlined transition includes a first lip on the molding extending from the window toward the body panel, a decorative strip with an outer wall substantially coplanar with the body panel and, a second lip overlying the body panel. It is yet another object to provide such a molding in which the decorative strip includes a pair of return bent side walls which seat against a pair of laterally extending legs which terminate in the retroflex lips to maintain them in position.

BRIEF DESCRIPTION OF THE DRAWINGS

These and other objects of the invention will appear from the following written description and the drawings in which.

DESCRIPTION OF THE PREFERRED EMBODIMENT

Figure 1:
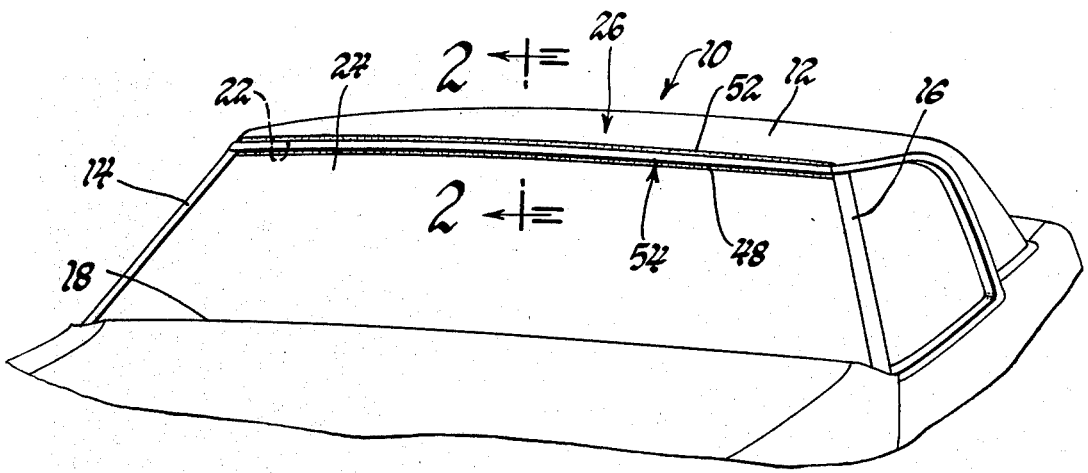
FIG. 1 is a partial perspective view of a vehicle body with the window reveal molding of the subject invention.

Referring first to FIG. 1, a vehicle body 10 includes a conventional roof panel 12, windshield pillars 14 and 16 and a conventional cowl structure 18 which cooperate to define a window opening 22 closed by a fixed window or windshield 24. The reveal molding 26 of the invention is included along the top of windshield 24 although it is to be understood that it could be included along the pillars 14 and 16, if desired.

Figure 2:
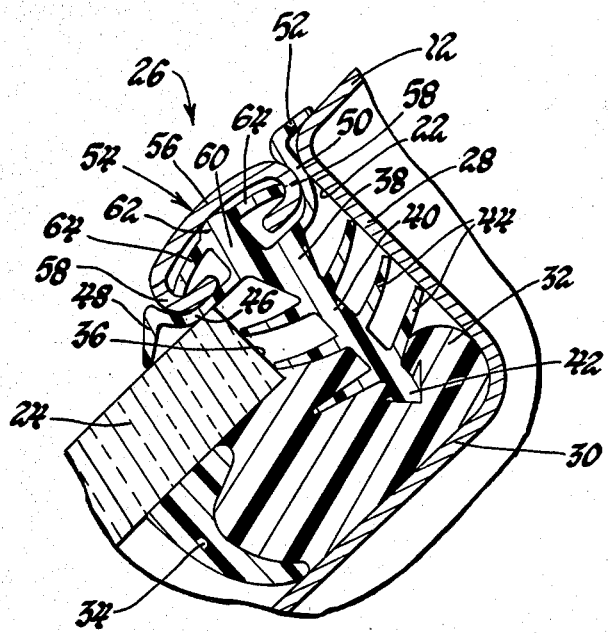
FIG. 2 is an enlarged cross-sectional view of the molding of the invention taken along line 2—2 of FIG. 1.

Referring now to FIG. 2, it may be seen that the roof panel 12 further includes an integral peripheral lateral flange 28 and an integral lateral flange 30. Flange 28 defines the upper edge of window opening 22. Windshield 24 is secured within opening 22 by a bead of curable adhesive 32 contained between flanges 28 and 30 and a flexible rubber dam 34 attached to the underside of windshield 24. Flanges similar to flanges 28 and 30 are provided by pillars 14 and 16 and cowl structure 18 and windshield 24 is similarly secured to these flanges. When installed, windshield 24 is inwardly offset from roof panel 12 and the peripheral edge 36 of the windshield is spaced from body flange 28. The reveal molding 26 conceals this space and provides a streamlined transition between the windshield 24 and the roof panel 12 as will be described.

Still referring to FIG. 2, reveal molding 26 includes an elongated extruded body portion 38 which is inserted in the space between windshield edge 36 and body flange 28. Body portion 38 is integral with a substantially planar elongated stem 40 which terminates in an elongated barbed edge 42. A series of backwardly bent resilient fins 44 extend laterally of stem 40 and engage window edge 36 and flange 28 to bridge the space therebetween. The barbed edge 42 is embedded in adhesive bead 32 which also flows in and around some of the fins 44 to secure body portion 38 in place.

A leg 46 integral with the first side of body portion 38 extends laterally therefrom over window edge 36 and terminates in a retroflex lip 48 which extends angularly away from windshield 24 toward roof panel 12. Another leg 50 integral with the second side of body portion 38 extends laterally therefrom and along flange 28 to terminate in a retroflex lip 52 which overlies roof panel 12. Although leg 50 does not extend laterally of body portion 38 as great a distance as leg 46 when molding 26 is in place, in the extrusion itself legs 50 and 46 are substantially coplanar and of the same length. Molding 26 further includes an elongated decorative strip designated generally 54 with a generally C-shaped cross-section including a decorative outer wall 56 and a pair of return bent side walls 58.

Still referring to FIG. 2, body portion 38 further includes an integral elongated rib 60 which is laterally offset from and parallel to the center line of body portion 38. Rib 60 has a height substantially equal to the depth of decorative strip 54 and terminates in a rounded shoulder 62. Rib 60 also includes a pair of downwardly bent resilient fins 64 intermediate shoulder 62 and body portion 38 which have a lateral separation substantially equal to the lateral separation of the inside of return bent side walls 58. Strip 54 is mounted to the body portion 38 by slide fitting over fins 64 and shoulder 62, creating a snug, three point contact with the inside of return bent side walls 58 and the inside of outer wall 56 respectively. This snug fit over the laterally offset rib 60 aids in the mounting of body portion 38, the placement and retention of legs 46 and 50, and in the streamlining of the transition from windshield 24 to roof panel 12 as will be described.

To mount the assembled molding strip 26 to the vehicle 10, pressure is applied to decorative outer wall 56 which is transferred from rib 60 to body portion 38 and to stem 40, thereby embedding barbed edge 42 into adhesive bead 32 and seating fins 44 as described. As molding 26 moves into position, one side wall 58 seats leg 46 against windshield 24 over edge 36 and the other side wall 58 seats leg 50 against roof panel flange 28. As legs 46 and 50 move into position, retroflex lip 48 engages windshield 24 and wraps leg 46 partially around the respective side wall 58, so that lip 48 extends angularly away from windshield 24 toward outer wall 56. The seating of leg 50 in place engages retroflex lip 52 partially over roof panel 12. Legs 46 and 50 insulate side walls 58 from windshield 24 and roof panel flange 28 respectively. In addition, retroflex lips 48 and 52 provide a streamlined transition from windshield 24, along lip 48 over outer wall 56 and finally over lip 52 to roof panel 12. The offset placement of rib 60 assures that decorative strip 54 does not overlie roof panel 12 which would disturb the streamlined transition described. Thus, strip 54 may be symmetrical and still maintain legs 46 and 50 in place as described.

Thus the invention provides an improved window reveal molding which provides a streamlined transition between a vehicle windshield and an adjacent outwardly offset vehicle body panel.

The embodiments the invention in which an exclusive property or privilege is claimed are defined as follows:

1. In a motor vehicle having an opening defined therein by a peripheral flange of a body panel and closed by a window panel mounted below the general plane of the body panel with a space between the peripheral edge of the window panel and the body panel flange, a molding for concealing the space and streamlining the transition from the window panel to the body panel, comprising, an elongated body portion adapted to be received within the space between the window panel edge and body panel flange with a first side of the body portion respective the peripheral edge of the window panel and a second side of the body portion respective the body panel flange, the body portion further including a leg extending laterally from the first side thereof over the window panel edge and terminating in a retroflex lip sloping from the window panel toward the body panel, the body portion further including a leg extending from the second side thereof along the body panel flange and terminating in a retroflex lip overlying the body panel, an elongated strip of generally C-shaped cross-section having a pair of return bent side walls and a decorative outer wall substantially coplanar with the body panel, and means on the body portion receivable within the return bent side walls to mount the elongated strip to the body portion with one of the return bent side walls bearing against the first leg to maintain its retroflex lip in contact with the window panel and with the other return bent side wall in contact with the second leg to maintain it in contact with the body panel flange and to maintain its retroflex lip in contact with the body panel, the sloping retroflex lip of the first leg, the decorative outer wall and the retroflex lip of the second leg forming a streamlined transition from the window panel to the body panel.

2. In a motor vehicle having an opening defined therein by a peripheral flange of a body panel and closed by a window panel mounted below the general plane of the body panel with a space between the peripheral edge of the window panel and the body panel flange, a molding for concealing the space and streamlining the transition from the window panel to the body panel, comprising, an elongated body portion adapted to be received within the space between the window panel edge and body panel flange with a first side of the body portion respective the peripheral edge of the window panel and a second side of the body portion respective the body panel flange, the body portion further including a leg extending laterally from the first side thereof over the window panel edge and terminating in a retroflex lip sloping from the window panel toward the body panel, the body portion further including a leg extending from the second side thereof toward the body panel and terminating in a retroflex lip overlying the body panel, an elongated strip of generally C-shaped cross-section having a pair of return bent side walls and a decorative outer wall substantially coplanar with the body panel, and means on the body portion receivable within the elongated strip to mount the elongated strip to the body portion including an elongated rib extending between the retroflex lips and terminating in a shoulder spaced from the body portion, a pair of resilient fins extending from the rib intermediate the shoulder and body portion and having a lateral separation slightly less than the lateral separation of the return bent side walls, the elongated strip being mounted to the body portion with each fin engaging the inside of a respective return bent side wall and with the shoulder engaging the inside of the outer wall of the strip, and with one of the return bent side walls bearing against the first leg and the other side wall bearing against the second leg, the sloping retroflex lip of the first leg, the decorative outer wall of the elongated strip and the retroflex lip of the second leg forming a streamlined transition from the window panel to the body panel.

* * * * *